United States Patent [19]

Kojima et al.

[11] Patent Number: 5,424,907
[45] Date of Patent: Jun. 13, 1995

[54] SOLID ELECTROLYTIC CAPACITORS AND METHOD FOR MANUFACTURING THE SAME

[75] Inventors: Toshikuni Kojima, Zama; Masao Fukuyama, Kawasaki; Yasuo Kudoh, Yokohama; Koichi Yoshida, Kawasaki, all of Japan

[73] Assignee: Matsushita Electric Industrial Co., Ltd., Osaka, Japan

[21] Appl. No.: 18,579

[22] Filed: Feb. 17, 1993

[30] Foreign Application Priority Data

Feb. 21, 1992 [JP] Japan ................................. 4-034613
Feb. 21, 1992 [JP] Japan ................................. 4-034615

[51] Int. Cl.$^6$ .......................... H01G 1/005; H01G 9/04
[52] U.S. Cl. ................................... 361/532; 361/523; 29/25.03
[58] Field of Search ............... 361/540, 523, 524, 525, 361/534, 533, 532; 29/25.03; 204/59 R, 78; 252/500, 511, 518, 519, 520, 521

[56] References Cited

U.S. PATENT DOCUMENTS

| | | | |
|---|---|---|---|
| 4,724,053 | 2/1988 | Jasne | 264/239 |
| 4,943,892 | 7/1990 | Tsuchiya | 361/525 |
| 4,959,753 | 9/1990 | Kudoh | 361/525 |
| 5,140,502 | 8/1992 | Kudoh | 361/540 |
| 5,174,867 | 12/1992 | Naarman | 252/500 |
| 5,187,650 | 2/1993 | Kudoh | 361/525 |

FOREIGN PATENT DOCUMENTS 58-17609 2/1983 Japan.

OTHER PUBLICATIONS

K. Hashizume et al "Application of Polyimide Thin Film Prepared by Electrodeposition for Dielectric of Capacitor", Electrochemical Society 58th Meeting Technical Digest of Papers, 1991 Spring, p. 251 (w/English translation).

K. Kinuta et al "Capacitor Whose Dielectric is Made of Polyimide Thin Film Prepared by Electrodeposition", Electrochemical society 58th Meeting Technical Digest of Papers, 1991 Spring, p. 252 (w/English translation).

Primary Examiner—Bruce A. Reynolds
Assistant Examiner—Michael D. Switzer
Attorney, Agent, or Firm—Lowe, Price, LeBlanc & Becker

[57] ABSTRACT

Solid electrolytic capacitors comprise a valve metal member having a dielectric film, with or without a conductive underlying layer, formed on the member, and a conductive polymer film formed on the layer. The conductive polymer film is formed by electrolytic polymerization of a polymerizable monomer contained in a system which comprises the monomer, a support electrolyte, and at least one member selected from silicic acids and silicates with or without phenol compounds. By this, the life of the capacitor even under high temperature and high humidity conditions is significantly improved. Methods for fabricating such capacitors are also described.

22 Claims, 1 Drawing Sheet

SOLID ELECTROLYTIC CAPACITORS AND METHOD FOR MANUFACTURING THE SAME

BACKGROUND OF THE INVENTION

1. Field of the Invention

This invention relates to solid electrolytic capacitors of the type which make use of a conductive polymer film as a solid electrolyte. The solid electrolytic capacitors have significantly improved life characteristics when used under high temperature anti high humidity conditions. The invention also relates to a method for manufacturing the capacitors of the type mentioned above.

2. Description of the Prior Art

Recent trends toward digitalizatlon and miniaturization of circuits used in the electric and electronic fields have demanded capacitors which are small in size and large in capacitance with a low impedance in a high frequency range.

Known capacitors which have been used in high frequency ranges include, for example, plastic film capacitors, mica capacitors, layer-built ceramic capacitors and the like. These capacitors are disadvantageously so large in size that a large capacitance is difficult to obtain.

On the other hand, a certain type of electrolytic capacitor is known as having a large capacitance. This type of capacitor includes, for example, an aluminum dry electrolytic capacitor and an aluminum or tantalum solid electrolytic capacitor., With the aluminum dry electrolytic capacitor, anodic and cathodic aluminum foils which have been preliminarily etched are convolutely wound through a paper separator. A liquid electrolyte is impregnated in the separator. With aluminum or tantalum solid electrolytic capacitors, solid electrolytes are used in order to improve the characteristics of the electrolytic capacitors. For the formation of the solid electrolyte, an anode foil is immersed in a manganese dioxide solution, which is thermally decomposed in a high temperature furnace at approximately 350° C. to form a manganese dioxide layer on the foil. Since the solid electrolyte is used, there are produced no disadvantages of liquid electrolytic capacitors such as of volatility of liquid electrolytes and the lowering of performance of the capacitor as will be caused by coagulation of liquid electrolytes at low temperatures. Accordingly, such solid electrolytic capacitors are better in frequency and temperature characteristics than liquid electrolytic capacitors. Like tantalum electrolytic capacitors, the aluminum electrolytic capacitor is advantageous in that since an anodized film serving as a dielectric layer can be formed very thinly, a large capacitance can be realized.

Recently, solid electrolytic capacitors have been developed using organic semiconductors such as 7,7,8,8-tetracyanoquinodimethane (TCNQ) salts as the solid electrolyte (Japanese Laid-open Patent Application No. 58-17609). Moreover, another type of solid electrolytic capacitor has also been proposed. In the capacitor, at least one of electrodes of the capacitor is made of a conductive polymer which is formed by electrolytic polymerization of polymerizable monomers such as pyrrole, thiophene, furan and the like. More particularly, a solid electrolytic capacitor has been reported in which a polyimide thin film serving as a dielectric film is electrodeposited on the surface of an electrode. A chemically polymerized conductive polymer film is built up on the polyimide thin film, on which an electrolytically polymerized conductive polymer film is further built up, thereby obtaining the capacitor (Electrochemical Society 58th Meeting Technical Digest of Papers, 1991 (Spring), pp. 251 and 252).

A diversity of capacitors have been thus employed in the electric and electronic fields. These capacitors are not necessarily satisfactory with respect to characteristic properties. For instance, film and mica capacitors are so large in size that a large capacitance is difficult to attain. The builtup ceramic capacitors have been developed to satisfy the requirements for the small size and the large capacitance but are disadvantageous in their high production costs and poor temperature characteristics.

With the aluminum electrolytic capacitors, the oxide film is liable to undergo damages. This makes it necessary to provide an electrolyte between the oxide film and a cathode in order to repair the damages. Where the electrolyte used is liquid, the resultant capacitor suffers leakage of the electrolyte. In addition, the liquid electrolyte is ion conductive. For these reasons, the capacitor brings about a decrease of electrostatic capacitance and an increase of loss, with poor high frequency characteristics and a great loss in low temperature ranges.

With solid electrolytic capacitors using manganese dioxide, the thermal decomposition at high temperatures has to be repeated several times, resulting in the damage of the oxide film. Additionally, manganese dioxide has a high specific resistance. For these reasons, the loss of the resulting capacitor is not sufficiently small in a high frequency range.

On the other hand, solid electrolytic capacitors using organic semiconductors such as TCNQ salts have better high frequency characteristics than those using manganese dioxide. However, on application of an organic semiconductor, the specific resistance is undesirably increased and the organic semiconductor is relatively poor in adhesion to the anode foil. Thus, such capacitors do not necessarily exhibit ideal characteristics.

Moreover, when a conductive polymer thin film is used as an electrode of capacitors, the capacitor exhibits good frequency and temperature characteristics along with good life characteristics under high temperature conditions. However, the dielectric film is liable to be attacked with moisture, so that the capacitor has not good life characteristics under high temperature and high humidity conditions.

SUMMARY OF THE INVENTION

It is therefore an object of the invention to provide an improved solid electrolytic capacitor having a conductive polymer film which serves as an electrode of the capacitor and which is formed directly or indirectly on a dielectric film of a valve metal.

It is another object of the invention to provide an improved solid electrolytic capacitor which is reliably worked over a long term under high temperature and high humidity conditions.

It is a further object of the invention to provide a method for fabricating solid electrolytic capacitors of the type mentioned above.

According to one embodiment of the,invention, there is provided a solid electrolytic capacitor which comprises a valve metal member having a dielectric film formed thereon, and a conductive polymer film which is formed on the dielectric film and consists of an electrolytically polymerized product of a electrolytic mixture which comprises at least one compound selected from the group consisting of silicic acids and silicates, a polymerizable monomer and a support electrolyte. The electrolytic polymerization is effected using the mixture in a liquid medium by a usual manner. Preferably, the electrolytic mixture should further comprise at least one phenolic derivative therein. It is also preferred to form a conductive underlying layer between the dielectric film and the conductive polymer film in order to facilitate the electrolytic polymerization.

According to another embodiment of the invention, there is also provided a method for fabricating the solid electrolytic capacitor of the type mentioned above which comprises providing a valve metal member having a dielectric film formed thereon, and subjecting the valve metal member to electrolytic polymerization of a polymerizable monomer in an electrolytic polymerization system which comprises, in a liquid medium, the polymerizable monomer, at least one compound selected from silicic acid and silicates, and a support electrolyte, thereby forming a conductive polymer film on the dielectric film. Of course, it is preferred to form a conductive underlying layer after formation of the dielectric film.

DETAILED DESCRIPTION AND EMBODIMENTS OF THE INVENTION

Figure 1:
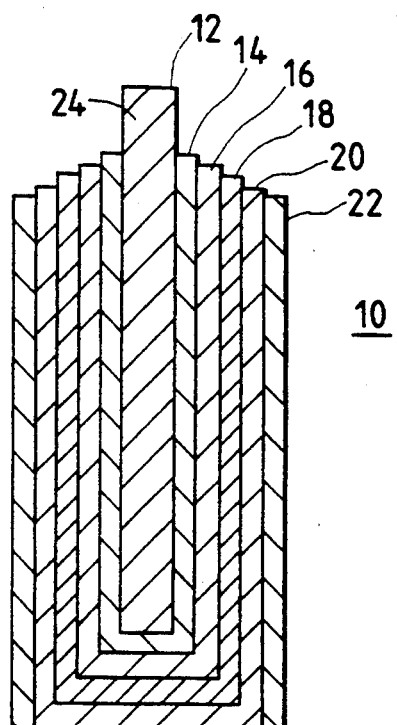
FIG. 1 is a schematic sectional view of a solid electrolytic capacitor according to an embodiment of the invention.
Figure 2:
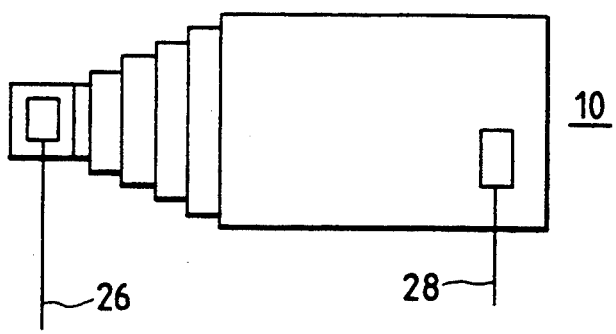
FIG. 2 is a plan view of the capacitor of FIG. 1.

Reference is now made to the accompanying drawings and particularly, to FIGS. 1 and 2 wherein a solid electrolytic capacitor according to the invention is illustrated.

In these figures, there is generally shown a capacitor unit 10. The unit 10 includes a valve metal member 12 having a dielectric film 14, with or without a conductive underlying layer 16, formed over the entire surface of the valve metal member 12 except a terminal portion 24 for anode. A conductive polymer film 18 is formed on the layer 16 in the figures. The conductive polymer film 18 may be used, as it is, as an electrode for cathode. Usually, a carbon layer 20 and a silver paint layer 22 are formed on the conductive polymer film 18 although not essentially required. A lead 26 for the anode and a lead 28 for the cathode are, respectively, attached to the valve metal member 12 and the conductive polymer layer 18 through the the carbon layer 20 and the silver paste layer 22 as is particularly shown in FIG. 2. The capacitor unit 10 may be encased in an appropriate casing (not shown) such as a resin casing to complete a solid electrolytic capacitor.

The constituent materials used to form the solid electrolytic capacitor according to the invention are first described.

The valve metal member is used in the form of a foil or a sheet as usual. Preferably, the foil or sheet is etched in order to increase the surface area of the foil or sheet. The valve metal may be tantalum or aluminium. The dielectric oxide film is formed by anodization as is well known in the art and is specifically described in examples although an electrodeposited polyimide film may also be used for this purpose. The conductive underlying layer 16 is not essentially required. If present, the layer may be made of materials which can be formed as a thin film and have an electric conductivity to such an extent that the electrolytically polymerized film can more smoothly grow on the thin film. Preferably, the layer 16 is made of manganese dioxide which is formed by thermal decomposition of organic or inorganic manganese compounds as is well known in the art. Examples of the manganese compounds include manganese nitrate, manganese acetate, manganese octylate, manganese naphthenate, manganese acetylacetone and the like.

The valve metal 12 on which the dielectric oxide film 14 and the conductive underlying layer 16 have been formed in this order is further formed with the conductive polymer film 18. The conductive polymer film 18 is formed by electrolytic polymerization of a monomer contained in an electrolytic polymerization system.

The monomers should preferably be polymerizable and soluble in water. Examples of such monomers include pyrrole, thiophene or derivatives thereof such as N-methylpyrrole although furan may be used in the practice of the invention. The monomers may be used singly or in combination.

In accordance with the present invention, the conductive polymer film 18 should be a film of an electrolytically polymerized product obtained from a mixture which comprises a polymerizable monomer, a support electrolyte and at least one compound selected from silicic acids and silicates in a liquid medium such as water. Silicic acid and silicates may be any ones which are capable of yielding silicate ions when dissolved in a liquid medium. The term "silicic acids" used herein means orthosilicic acid, metasilicic acid, metadisilicic acid, metatrisilicic acid, silicon dioxide hydrates having not a defined structure, mixtures thereof and the like. Silicates include organic silicates such as ethyl silicate, tetraethylsilicate, tetraphenyl silicate, tetramethyl silicate and the like, and inorganic silicates such as sodium silicate, potassium silicate, calcium silicate and the like. Of these, sodium silicate is preferred.

These silicic acids and silicates may be used singly or in combination. In the electrolytic polymerization system, the silicic acid or silicate compound has a significant effect even when used in very small amounts. Preferably, the compound is used in an amount of not less than $1 \times 10^{-4}$ mole/liter, more preferably not less than $1 \times 10^{-3}$ mole/liter.

The support electrolyte used in this system may be ones, which are ordinarily used for this purpose, such as perchlorates, sulfonates, carboxylates and phosphates. It is preferred to use naphthalenesulfonates having an alkyl substituent having from 1 to 12 carbon atoms or alkyl phosphates having from 2 to 12 carbon atoms. More particularly, there are mentioned sodium monomethylnaphthalenesulfonate, sodium triisopropylnaphthalenesulfonate, sodium monoisopropylnaphthalenesulfonate, sodium dibutylnaphthalenesulfonate, propyl phosphate, butyl phosphate, hexyl phosphate and the like. These electrolytes may be used singly or in combination.

The medium for the electrolytic polymerization may be one which is able to dissolve the monomer, the support electrolyte and the at least one silicic acid or silicate compound but is substantially incapable of dissolving the dielectric oxide film. In general, water is used. Besides, organic solvents such as acetonitrile, propylene carbonate and the like may be used as the medium provided that the oxide film on the valve metal is not impeded and is capable of yielding an electric conductance sufficient for the electrolytic polymerization. Preferably, an aqueous system is used.

The monomer and the support electrolyte are, respectively, used at concentrations of from 0.01 to 1 mole/liter and from 0.01 to 0.5 moles/liter.

The conductive polymer film which is obtained from the electrolytic polymerization system comprising the silicic acid and/or silicate, a polymerizable monomer and a support electrolyte is provided as an electrode or solid electrolyte of the capacitor of the invention. As a result, the dielectric film of the capacitor is suppressed from being degraded owing to the hydration of the film. In addition, the electrolytically polymerized conductive polymer film having good thermal stability is used, so that when the capacitor is allowed to stand under high temperature and high humidity conditions, it is not liable to suffer degradation.

In order to further improve the life characteristics of the capacitor particularly under high temperature and high humidity conditions, it is preferred to further add phenol or a phenol derivative to the electrolytic polymerization system. The phenol derivatives mean phenols or aromatic hydroxy compounds having a substituent or substituents. The substituent should preferably be one which has great electron attractive properties. Preferable examples include nitrophenol. Besides, there are also preferably used cyanophenol, hydroxyacetophenone, hydroxybenzaldehyde, hydroxybenzamide, hydroxybenzoic acid and the like.

These phenol derivatives are usually used in an amount of 0.005 to 0.5 moles/liter of the system.

Fabrication of the solid electrolytic capacitor unit 10 according to the method of the invention is described with reference to FIG. 3.

The valve metal foil member 12 is first provided. This member 12 is preferably subjected to etching by any known procedure to increase the surface area. The etched foil 12 is subsequently anodized, except a terminal for anode, by immersion in an acid solution to form the dielectric oxide film 14 on the surface of the member 12. The anodization is effected by an ordinary electrochemical procedure. The acid used for this purpose may be an inorganic acid such as phosphoric acid or an organic acid such as oxalic acid, adipic acid or the like. If the valve metal is aluminum, $Al_2O_3$ is formed on the foil surface. Alternatively, if tantalum is used, $Ta_2O_5$ is formed as the oxide film 14. Preferably, the member 12 on which the anodized film 14 has been formed is immersed in an aqueous solution, for example, of a water-soluble manganese compound for a given time and dried in air at 200° to 400° C. thereby thermally decomposing the compound into manganese dioxide to form a manganese dioxide underlying layer 16 on the anodized film 14.

The conductive polymer film 18 is then formed on the conductive underlying layer 16. This is particularly shown in FIG. 3. That is, the valve metal member 12 is immersed in an electrolytic polymerization system 32 which comprises at least one compound selected from silicic acids and silicates, a polymerizable monomer and a support electrolyte as defined with respect to the capacitor of the invention. A potential sufficient to cause the electrolytic polymerization is applied between a first electrode 30 for the polymerization which contacts the conductive underlying layer 16 and a counter electrode 34 kept away from the first electrode 30. As a result, a conductive polymer film is formed on the first electrode 30, from which the conductive polymer film gradually grows toward the conductive underlying layer made, for example, of manganese dioxide. Finally, the conductive underlying layer 16 is fully covered with the conductive polymer film 18 to a level at which the valve metal member 12 has been immersed as shown in FIG. 1. In FIG. 3, reference number 36 designates a heat-resistant insulating tape which prevents the formation of the dielectric film 14 on a terminal portion 24 of the valve metal 12.

After the conductive polymer film 18 has fully covered the surface of the underlying layer 16 immersed in the system, the polymerization reaction is stopped, followed by washing the polymer film 18 with water to remove the at least one compound, an unreacted monomer, the electrolyte and unstable oligomers. For the washing, a solvent which is easy to dry is used including, for example, water, alcohols, acetonitrile, ketones or the like.

It will be noted that in the above illustration, the underlying layer is used, but the electrolytic polymerization may proceed directly on the dielectric film and thus, the underlying layer 16 is not essentially required.

A carbon layer and a silver paste layer may be formed on the conductive polymer film, after which the cathode lead 28 for the capacitor is attached to the conductive polymer film through the carbon layer and the silver paste layer. Similarly, the lead 26 for the anode may be attached to the valve metal member at this stage to complete the capacitor unit 10. The resultant capacitor unit 10 may be covered with a resin such as an epoxy resin. Finally, the covered element is aged, for example, by application of an appropriate potential at a normal or elevated temperature for several hours.

As a matter of course, the electrolytic polymerization may be effected using the system which further comprises phenol derivatives as defined hereinbefore.

In the practice of the invention, the thickness of the conductive polymer film is generally in the range of from 5 to 50 micrometers.

Moreover, the electrolytic polymerization system may further comprise additives such as de-roamers capable of dissipating bubbles during the course of the polymerization and surface active agents for improving wettability between the anode surface and the polymerization system.

The present invention is more particularly described by way of examples.

EXAMPLE 1 AND COMPARATIVE EXAMPLE 1

Figure 3:
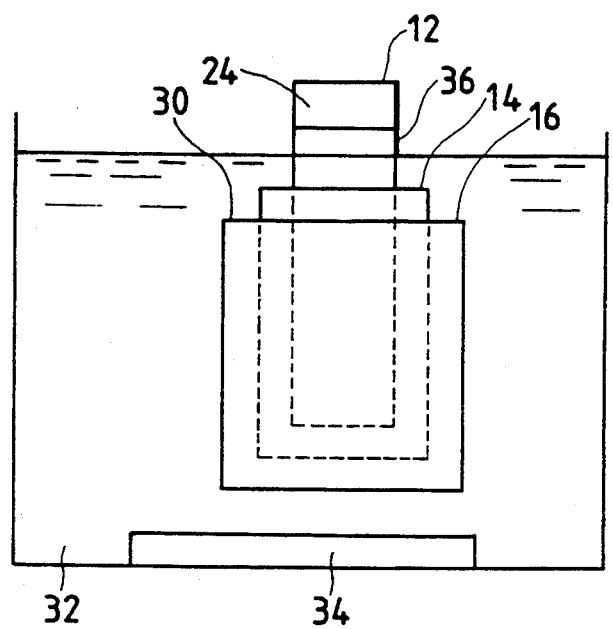
FIG. 3 is a schematic side view illustrating formation of an electrolytically polymerized conductive polymer film according to the method of the invention.

Capacitor units as shown in FIGS. 1 to 3 were fabricated in the following manner.

An aluminum foil 12 was provided and attached with a heat-resistant insulating tape 24 to divide the foil 12 into two sections. One section with a smaller area was for a terminal for anode and the other section with a size of 4 mm × 5 mm was to be formed with a dielectric film.

The tape-attached Al foil 12 was placed in a 7% ammonium adipate aqueous solution and anodized at about 70° C. by application of a potential of 42 volts for 40 minutes to form a dielectric film 14 thereon. Thereafter, the anodized aluminum film was applied with a manganese nitrate aqueous solution and heated at 300° C. for 20 minutes to form a thermally decomposed manganese oxide conductive layer 16. The foil was then immersed, as shown in FIG. 3, in an electrolytic polymerization solution 32 which were comprised of 0.25 moles/liter of pyrrole, 0.1 mole/liter of sodium triisopropylnaphthalenesulfonate, 0.001 mole/liter of sodium silicate and water. Subsequently, an electrode 30 for the electrolytic polymerization was brought close to or contacted with the manganese dioxide layer 16. A constant potential of 2.5 volts was applied for 30 minutes between the electrode 30 for electrolytic polymerization and a counter electrode 34 provided in a spaced relation to the first-mentioned electrode 30 to form a conductive polypyrrole film 18 on the manganese oxide layer 16.

Thereafter, the electrode for the electrolytic polymerization was removed and the film was washed with water and dried. A carbon paint layer 20 and a silver paint layer 22 were formed on the polymer film in this order, from which a cathode lead 28 was taken out. An anode lead 26 was also provided at the terminal of the valve metal 12.

The above procedure was repeated, thereby making ten capacitor samples.

These capacitors were each aged under conditions of a relative humidity of 85%, a temperature of 85° C. and a constant potential of 10 volts, one hour after which a potential of 16.3 volts was applied for one hour. Then, each capacitor was subjected to measurements of an initial capacitance and a loss at 120 Hz. Thereafter, the respective capacitors were exposed to high temperature and high humidity conditions of 85° C. and 85% over 500 hours while applying a potential of 13 volts. The exposed capacitors were subjected to measurements of the capacitance and the loss at 120 Hz. The average values of the measurements are shown in Table 1.

For comparison (Comparative Example 1), the general procedure of Example 1 was repeated except that sodium silicate was not added, thereby making ten capacitor samples. These samples were similarly aged and measured with respect to the capacitance and loss characteristics. The results are also shown in Table 1.

From the table, it will be seen that the capacitors of the example are better than those of the comparative example and are significantly smaller in the differences between the initial characteristics and the characteristics obtained after the life-accelerated tests.

This is considered for the reason that the hydration of the dielectric film is suppressed and the electrolytically polymerized conductive polymer film used as the electrode has good thermal stability. Thus, the resulting capacitor has good life characteristics.

EXAMPLE 2

The general procedure of Example 1 was repeated except that the concentration of sodium silicate was changed to 0.01 mole/liter, thereby making ten capacitors. These capacitors were subjected to aging and measurements in the same manner as in Example 1. The results are shown in Table 1. The results reveal that the capacitors obtained using a concentration of sodium silicate of 0.01 mole/liter are smaller in the differences between the initial characteristics and the characteristics after the accelerated tests than those of Comparative Example 1. Thus, good results as in Example 1 were obtained.

EXAMPLE 3

The general procedure of Example 1 was repeated except that the concentration of sodium silicate was changed to 0.0001 mole/liter, thereby making ten capacitors. These capacitors were subjected to aging and measurements in the same manner as in Example 1. The results are shown in Table 1. The results reveal that the capacitors obtained using a concentration of sodium silicate of 0.01 mole/liter are smaller in the differences between the initial characteristics and the characteristics after the accelerated tests than those of Comparative Example 1. In this case, good results as in Example 1 were obtained.

EXAMPLE 4

The general procedure of Example 1 was repeated except that sodium silicate was replaced by potassium silicate with a concentration of 0.001 mole/liter, thereby making ten capacitors. These capacitors were subjected to aging and measurements in the same manner as in Example 1. The results are shown in Table 1. The results reveal that the capacitors obtained using potassium silicate are also smaller in the differences between the initial characteristics and the characteristics after the accelerated tests than those of Comparative Example 1. Good results as in Example 1 were obtained in this case.

EXAMPLE 5

The general procedure of Example 1 was repeated except that sodium silicate was replaced by silicic acid with a concentration of 0.001 mole/liter, thereby making ten capacitors. These capacitors were subjected to aging and measurements in the same manner as in Example 1. The results are shown in Table 1. The results reveal that the capacitors obtained from an electrolytic polymerization solution using silicic acid are also smaller in the differences between the initial characteristics and the characteristics after the accelerated tests than those of Comparative Example 1. Good results as in Example 1 were obtained.

EXAMPLE 6

The general procedure of Example 1 was repeated except that there were used thiophene and acetonitrile instead of pyrrole and water, respectively, thereby making ten capacitor samples. These capacitors were subjected to aging and measurements in the same manner as in Example 1. The results are shown in Table 1.

For comparison (Comparative Example 2), the procedure Example 6 was repeated except that sodium silicate was not used, thereby making ten capacitors. These capacitors were subjected to the measurements as set forth above and the average values of the measurements are shown in Table 1.

The results reveal that the capacitors obtained from an electrolytic polymerization solution using sodium silicate are smaller in the differences between the initial characteristics and the characteristics after the accelerated tests than those of Comparative Example 2. Good results as in Example 1 were obtained.

EXAMPLE 7

The general procedure of Example 1 was repeated except that there was used sodium triisopropylnaphthalenesulfonate instead of sodium dibutylnaphthalenesulfonate, thereby making ten capacitor samples. These capacitors were subjected to aging and measurements with the results shown in Table 1.

For comparison (Comparative Example 3), the above procedure was repeated except that sodium silicate was not added, thereby making ten capacitor samples. These samples were subjected to measurements in the same manner as set out hereinbefore. The results are also shown in Table 1.

The results reveal that the capacitors obtained from an electrolytic polymerization solution using sodium silicate are smaller in the differences between the initial characteristics and the characteristics after the accelerated tests than those of Comparative Example 3. Good results as in Example 1 were obtained.

EXAMPLE 8

The general procedure of Example 1 was repeated except that n-butyl phosphate was used instead of sodium triisopropylnaphthalenesulfonate, thereby making ten capacitor samples. These samples were subjected to aging and measurements in the same manner as in Example 1. The results are shown in Table 1.

For comparison (Comparative Example 4), the above procedure was repeated except that sodium silicate was not added, thereby making ten capacitor samples. These samples were subjected to aging and measurements in the same manner as set out hereinbefore. The results are also shown in Table 1.

From Table 1, it will be seen that the capacitors obtained from an electrolytic polymerization solution using sodium silicate are smaller in the differences between the initial characteristics and the characteristics after the accelerated tests than those of Comparative Example 4. Good results as in Example 1 were obtained.

of 1.5 volts were applied for 50 minutes to form a conductive polypyrrole film on the manganese oxide layer. After washing with water and drying, a carbon paint layer and a silver paint layer 6 were formed on the conductive polypyrrole film in this order to obtain a solid electrolytic capacitor. The above procedure was repeated thereby making ten capacitors in total.

These capacitors were each aged at 20 volts for 1 hour and subjected to measurements of an initial capacitance and a loss at 120 Hz. Thereafter, the respective capacitors were exposed to high temperature and high humidity conditions of 85° C. and 854 over 500 hours. Then, the exposed capacitors were subjected to measurements of the capacitance and the loss at 120 Hz. The average values of the measurements are shown in Table 2.

For comparison (Comparative Example 5), the general procedure of Example 9 was repeated except that sodium silicate and nitrophenol were not added, thereby making ten capacitor samples. These samples were similarly measured with respect to the capacitance and loss characteristics. The results are also shown in Table 2.

From the table, it will be seen that the capacitors of the example are better in the stability under high temperature and high humidity conditions than those of the comparative example.

EXAMPLE 10

The general procedure of Example 9 was repeated except that calcium silicate was used instead of sodium

TABLE 1

|  | Initial Characteristics | | Characteristics After 500 Hours under Conditions of 85° C., 85% and 13 Volts | |
|---|---|---|---|---|
|  | Capacitance (μF) | tan δ (%) | Variation in Capacitance Relative to Initial Capacitance (%) | tan δ (%) |
| Example 1 | 4.89 | 1.16 | −10.53 | 2.47 |
| Example 2 | 4.78 | 1.25 | −10.65 | 2.59 |
| Example 3 | 4.91 | 1.15 | −11.39 | 2.46 |
| Example 4 | 4.76 | 1.31 | −10.92 | 2.73 |
| Example 5 | 4.97 | 1.16 | −11.39 | 2.87 |
| Example 6 | 4.81 | 1.21 | −11.20 | 2.88 |
| Example 7 | 4.81 | 1.14 | −10.60 | 2.69 |
| Example 8 | 4.84 | 1.14 | −10.25 | 2.41 |
| Comp. Ex. 1 | 4.99 | 1.19 | −19.84 | 4.52 |
| Comp. Ex. 2 | 4.79 | 1.33 | −20.04 | 4.91 |
| Comp. Ex. 3 | 4.80 | 1.22 | −20.20 | 4.85 |
| Comp. Ex. 4 | 4.93 | 1.25 | −21.95 | 5.00 |

In the following examples, use of phenol derivatives is described.

EXAMPLE 9

A 7 mm long×10 mm wide aluminum etched foil which had a lead for anode was provided and immersed in a 3% ammonium adipate aqueous solution and anodized at about 70° C. by application of a potential of 70 volts for 40 minutes to form a dielectric film thereon. Thereafter, the anodized aluminum film was applied with a manganese nitrate aqueous solution, dried in air and heated at 300° C. for 30 minutes to form a thermally decomposed manganese oxide conductive layer.

The foil was then immersed, as shown in FIG. 3, in an electrolytic polymerization solution which was comprised of 0.001 mole/liter of sodium silicate, 0.1 mole/liter of nitrophenol, 0.5 moles/liter of pyrrole, 0.1 mole/liter of sodium triisopropylnaphthalenesulfonate and water. Subsequently, an electrode for the electrolytic polymerization was brought close to or contacted with the manganese dioxide layer. A constant potential silicate, thereby making ten capacitors. After aging at 20 volts for 1 hour, the capacitors were subjected to measurements of initial capacitance and loss at 120 Hz. After exposure to high temperature and high humidity conditions over 500 hours, the capacitors were again subjected to the measurements of the capacitance and loss at 120 Hz. Average values of the measurements are shown in Table 2.

The comparison with Comparative Example 5 reveals that the capacitors of Example 10 are better in the stability under high temperature and high humidity conditions.

EXAMPLE 11

The general procedure of Example 9 was repeated except that silicic acid hydrate was used instead of sodium silicate, thereby making ten capacitors. After aging at 20 volts for 1 hour, the capacitors were subjected to measurements of initial capacitance and loss at 120 Hz. After exposure to high temperature and high humidity conditions over 500 hours, the capacitors were again subjected to the measurements of the capacitance and loss at 120 Hz. Average values of the measurements are shown in Table 2.

The comparison with Comparative Example 5 reveals that the capacitors of Example 10 are better in the stability under high temperature and high humidity conditions.

EXAMPLE 12

The general procedure of Example 9 was repeated except that hydroxybenzoic acid was used instead of nitrophenol, thereby making ten capacitors. After aging at 20 volts for 1 hour, the capacitors were subjected to measurements of initial capacitance and loss at 120 Hz. After exposure to high temperature and high humidity conditions over 500 hours, the capacitors were again subjected to the measurements of the capacitance and loss at 120 Hz. Average values of the measurements are shown in Table 2.

The comparison with Comparative Example 5 reveals that the capacitors of Example 10 are better in the stability under high temperature and high humidity conditions.

EXAMPLE 13

The general procedure of Example 9 was repeated except that n-butyl phosphate was used instead of sodium triisopropylnaphthalenesulfonate, thereby making ten capacitors. After aging at 20 volts for 1 hour, the capacitors were subjected to measurements of initial capacitance and loss at 120 Hz. After exposure to high temperature and high humidity conditions over 500 hours, the capacitors were again subjected to the measurements of the capacitance and loss at 120 Hz. Average values of the measurements are shown in Table 2.

For comparison (Comparative Example 6), the general procedure of Example 13 was repeated except that sodium silicate and nitrophenol were not added, thereby making ten capacitor samples. These samples were similarly measured with respect to the capacitance and loss characteristics. The results are also shown in Table 2.

From the table, it will be seen that the capacitors of the example are better in the stability under high temperature and high humidity conditions than those of the comparative example.

EXAMPLE 14

The general procedure of Example 9 was repeated except that 0.5 moles of thiophene, 0.1 mole of tetrabutylammonium p-toluenesulfonate and acetonitrile were, respectively, used instead of pyrrole, sodium triisopropylnaphthalenesulfonate and water, thereby making ten capacitors. After aging at 20 volts for 1 hour, the capacitors were subjected to measurements of initial capacitance and loss at 120 Hz. After exposure to high temperature and high humidity conditions over 500 hours, the capacitors were again subjected to the measurements of the capacitance and loss at 120 Hz. Average values of the measurements are shown in Table 2.

For comparison (Comparative Example 7), the general procedure of Example 13 was repeated except that sodium silicate and nitrophenol were not added, thereby making ten capacitor samples. These samples were similarly measured with respect to the capacitance and loss characteristics. The results are also shown in Table 2.

From the table, it will be seen that the capacitors of the example are better in the stability under high temperature and high humidity conditions than those of the comparative example.

TABLE 2

|  | Initial Characteristics | | Characteristics After 500 Hours under Conditions of 85° C. and 85% | |
|---|---|---|---|---|
|  | Capacitance ($\mu F$) | tan δ (%) | Capacitance ($\mu F$) | tan δ (%) |
| Example 9 | 4.8 | 1.1 | 4.6 | 1.5 |
| Example 10 | 4.6 | 1.2 | 4.4 | 1.9 |
| Example 11 | 4.8 | 1.1 | 4.6 | 1.4 |
| Example 12 | 4.6 | 1.2 | 4.4 | 1.8 |
| Example 13 | 4.7 | 1.2 | 4.5 | 1.6 |
| Example 14 | 4.2 | 1.3 | 4.0 | 1.9 |
| Comp. Ex. 5 | 4.7 | 1.1 | 4.1 | 5.5 |
| Comp. Ex. 6 | 4.5 | 1.1 | 3.9 | 5.7 |
| Comp. Ex. 7 | 4.1 | 1.42 | 3.6 | 7.2 |

In these examples, sodium silicate, potassium silicate and silicic acid or its hydrate were used as providing a dopant of silicate ions, and other silicic acids and silicates will provide similar results.

Moreover, similar results are obtained when using other polymerizable monomers defined before and also using support electrolytes other than sodium triisopropylnaphthalenesulfonat, sodium dibutylnaphthalenesulfonate and n-butyl phosphate used in the examples irrespective of the types of anions and cations of the support electrolytes.

Likewise, aluminum was used in the examples as the valve metal and other valve metals such as tantalum may likewise used. In this connection, the dielectric film used was an aluminum oxide layer but films of other materials such as an electrodeposited polyimide film as set out in Prior Art may also be used with similar results.

Although the capacitors of the polar type have been set forth in the examples, the electrolytically polymerized conductive film may be applied to irrespective of the type of capacitor. For instance, similar results will be obtained when the conductive film is applied to capacitors of a non-polar type.

What is claimed is:

1. A solid electrolytic capacitor which comprises a valve metal member having a dielectric film formed thereon, and a conductive polymer film which is formed on the dielectric film and consists of an electrolytically polymerized product of a electrolytic mixture which comprises at least one compound selected from the group consisting of silicic acids and silicates, an polymerizable monomer and a support electrolyte.

2. The solid electrolytic capacitor according to claim 1, wherein said at least one compound is a silicate.

3. The solid electrolytic capacitor according to claim 2, wherein said silicate is sodium silicate.

4. The solid electrolytic capacitor according to claim 1, wherein said valve metal member is aluminum.

5. The solid electrolytic capacitor according to claim 1, wherein said valve metal member is tantalum.

6. The solid electrolytic capacitor according to claim 1, wherein a conductive underlying layer is provided between said dielectric film and said conductive polymer film.

7. The solid electrolytic capacitor according to claim 6, wherein said conductive underlying layer consists of manganese oxide.

8. The solid electrolytic capacitor according to claim 1, wherein tile polymerizable monomer is a member selected from the group consisting of pyrrole, thiophene, derivatives of pyrrole and thiophene and mixtures thereof.

9. The solid electrolytic capacitor according to claim 1, further comprising a phenol compound in said mixture.

10. The solid electrolytic capacitor according to claim 9, wherein said phenol compound is nitrophenol.

11. The solid electrolytic capacitor according to claim 1, wherein said support electrolyte is a naphthalenesulfonate having an alkyl substituent having from 1 to 12 carbon atoms.

12. The solid electrolytic capacitor according to claim 1, wherein said support electrolyte is an alkyl phosphate having from 2 to 12 carbon atoms.

13. A method for fabricating a solid electrolytic capacitor which comprises:
providing a valve metal member having a dielectric film formed thereon; and
subjecting the valve metal member to electrolytic polymerization of a polymerizable monomer in an electrolytic polymerization system which comprises, in a liquid medium, the polymerizable monomer, at least one compound selected from silicic acids and silicates, and a support electrolyte, thereby forming a conductive polymer film on the valve metal member.

14. The method according to claim 13, wherein the liquid medium is water.

15. The method according to claim 13, wherein said electrolytic polymerization system comprises 0.01 to 1 mole/liter of the monomer, 0.01 to 0.5 moles/liter of support electrolyte, and not less than $1 \times 10^{-4}$ mole/liter of said at least one compound.

16. The method according to claim 15, wherein said at least one compound is present in an amount of not less than $1 \times 10^{-3}$ mole/liter.

17. The method according to claim 13, wherein said monomer is a member selected from the group consisting of pyrrole, thiophene, derivatives of pyrrole and thiophene and mixtures thereof.

18. The method according to claim 13, wherein said support electrolyte consists of a naphthalenesulfonate having an alkyl substituent having from 1 to 12 carbon atoms.

19. The method according to claim 13, wherein said support electrolyte consists of an alkyl phosphate having from 2 to 12 carbon atoms.

20. The method according to claim 13, wherein said electrolytic polymerization system further comprises a phenol compound in an amount of from 0.005 to 0.5 moles/liter.

21. The method according to claim 20, wherein said phenol compound is nitrophenol.

22. The method according to claim 13, further comprising providing a conductive underlying layer between said dielectric film and said conductive polymer film.

* * * * *